(12) United States Patent
Mita (10) Patent No.: US 9,878,680 B2
(45) Date of Patent: Jan. 30, 2018

(54) VEHICLE SEAT

(71) Applicant: TOYOTA BOSHOKU KABUSHIKI KAISHA, Aichi-ken (JP)

(72) Inventor: Hiroyuki Mita, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 161 days.

(21) Appl. No.: 15/085,475

(22) Filed: Mar. 30, 2016

(65) Prior Publication Data

US 2016/0297382 A1    Oct. 13, 2016

(30) Foreign Application Priority Data

Apr. 7, 2015 (JP) ................................. 2015-078562

(51) Int. Cl.
| | |
|---|---|
| B60N 2/68 | (2006.01) |
| B60R 16/02 | (2006.01) |
| B60R 16/027 | (2006.01) |
| B60N 2/02 | (2006.01) |

(52) U.S. Cl.
CPC ............ *B60R 16/0215* (2013.01); *B60N 2/68* (2013.01); *B60R 16/027* (2013.01); *B60N 2002/0264* (2013.01)

(58) Field of Classification Search
CPC ... B60R 16/0215; B60R 16/027; B60R 7/043; B60R 11/06; A47C 7/62; A47C 7/72; A47C 9/02; A47C 9/10; B64D 11/06; B60N 2/305; B60N 2/206; B60N 2/4876; B60N 2/68

USPC ... 297/463.1, 463.2, 188.08, 188.12, 440.22, 297/217.3; 296/37.15

See application file for complete search history.

(56) References Cited

U.S. PATENT DOCUMENTS

| | | | |
|---|---|---|---|
| 6,619,588 B2 * | 9/2003 | Lambiaso ........... | B64D 11/0015 244/118.5 |
| 6,848,653 B2 * | 2/2005 | Finke ................. | B64D 11/0015 244/118.5 |
| 7,137,594 B2 * | 11/2006 | Mitchell ................ | B64D 11/00 244/118.6 |
| 7,143,978 B2 * | 12/2006 | Smallhorn ............. | B64D 11/06 244/118.5 |

(Continued)

FOREIGN PATENT DOCUMENTS

JP         2000-59958        2/2000

*Primary Examiner* — Syed A Islam (74) *Attorney, Agent, or Firm* — Greenblum & Bernstein, P.L.C.

(57) ABSTRACT

A vehicle seat includes a seat frame; and a holding member including a mounting portion that is attached to the seat frame. The holding member is attached to the seat frame via the mounting portion and is disposed and configured to hold a held member; the mounting portion is a tubular part projecting from the holding member toward the seat frame; a fastening member projects from one of the seat frame and the mounting portion and is inserted into the other of the seat frame and the mounting portion such that the holding member is fastened and attached to the seat frame; and the holding member includes five or more flat plate-shaped reinforcing portions projecting from the holding member toward the seat frame, and the five or more reinforcing portions are connected to the mounting portion, and are disposed radially around the mounting portion.

5 Claims, 11 Drawing Sheets

(56) References Cited

U.S. PATENT DOCUMENTS

| | | | | |
|---|---|---|---|---|
| 7,997,656 | B2* | 8/2011 | Inagaki | B60N 2/0224 |
| | | | | 297/217.3 |
| 8,226,145 | B2* | 7/2012 | Kasuya | B60R 16/0215 |
| | | | | 296/37.15 |
| 9,039,081 | B2* | 5/2015 | Arefi | B60N 2/686 |
| | | | | 297/188.08 |
| 2013/0146354 | A1* | 6/2013 | Shimada | H02G 3/0418 |
| | | | | 174/72 A |
| 2014/0167483 | A1* | 6/2014 | Schneider | B60N 2/06 |
| | | | | 297/463.1 |
| 2014/0203619 | A1* | 7/2014 | Dapra | A47C 7/008 |
| | | | | 297/463.1 |
| 2014/0333113 | A1* | 11/2014 | Izawa | B60N 2/015 |
| | | | | 297/463.1 |
| 2015/0232009 | A1* | 8/2015 | Jamieson | B60N 2/682 |
| | | | | 297/452.18 |
| 2016/0355228 | A1* | 12/2016 | Wolfmueller | B25H 3/022 |

* cited by examiner

VEHICLE SEAT

INCORPORATION BY REFERENCE

The disclosure of Japanese Patent Application No. 2015-078562 filed on Apr. 7, 2015 including the specification, drawings and abstract is incorporated herein by reference in its entirety.

BACKGROUND OF THE INVENTION

1. Field of the Invention

The present invention relates to a vehicle seat including a seat frame serving as a seat framework, and a holding member that is attached to the seat frame and is able to hold a held member.

2. Description of Related Art

As this kind type of a vehicle seat, a vehicle seat including a seat frame serving as a seat framework, a bracket corresponding to a holding member, and a wire harness corresponding to a held member is well known (see Japanese Patent Application Publication No. 2000-59958 (JP 2000-59958 A)). The wire harness is a cord member disposed inside a seat, and a connector is attached to an intermediate portion of the wire harness. The connector is a substantially cube housing, and a pair of guide pieces bent in a substantially L-shape is formed on both sides of a bottom part of the connector. Further, the bracket is a flat plate-shaped resin molded product that can be folded in half, and includes a stem and guide rails. The stem is an anchor-shaped part projecting from one side of the bracket, and is inserted into a mounting hole in a seat frame top surface so as to engage with a peripheral edge around the mounting hole. Further, the guide rails are parts that can lock the guide pieces of the connector, and is disposed on the other side of the bracket in a state where the bracket is folded in half. In the technique as known in the art, the bracket is folded in half, and then, the stem disposed on one surface thereof is inserted into the mounting hole in the seat frame top surface so as to engage therewith. Subsequently, the guide pieces of the connector are locked by the guide rails. Thus, the wire harness can be held by the bracket disposed on the seat frame top surface.

In the technique as known in the art, the stem that is inserted into the mounting hole to be engaged with the peripheral edge around the mounting hole is made of resin. Therefore, a mounting strength of the bracket is slightly insufficient. In the above configuration, for example, when the wire harness is pulled, the bracket may swing, which may cause the stem to fall of from the mounting hole. In particular, as the bracket becomes heavier due to holding of a plurality of held members such as the wire harness, the possibility that the bracket swings largely and the stem falls off from the mounting hole increases.

SUMMARY OF THE INVENTION

The present invention provides a vehicle seat in which a holding member is more firmly attached to a seat frame.

A vehicle seat according to an aspect of the present invention includes a seat frame serving as a seat framework; and a holding member including a mounting portion that is attached to the seat frame. The holding member is attached to the seat frame via the mounting portion and is disposed and configured to hold a held member that is other than the seat frame and the holding member. In this configuration, it is desirable that the holding member should be more firmly attached to the seat frame.

In the above aspect, the mounting portion is a tubular part projecting from the holding member toward the seat frame. A fastening member projects from one of the seat frame and the mounting portion and is inserted into the other of the seat frame and the mounting portion such that the holding member is fastened and attached to the seat frame.

The holding member includes five or more flat plate-shaped reinforcing portions projecting from the holding member toward the seat frame, and the five or more reinforcing portions are connected to the mounting portion, and are disposed radially around the mounting portion. As described above, in the above aspect of the present invention, it is possible to more firmly attach the holding member to the seat frame via the fastening member while the mounting portion is reinforced by the five or more reinforcing portions. That is, in the above configuration, it is possible to more firmly attach the holding member to the seat frame.

In the above aspect of the present invention, the holding member may include a body portion, the mounting portion provided on one side of the body portion, and a hold portion provided on another side of the body portion; and in a state where the mounting portion is fastened to the seat frame, the hold portion may hold the held member and may be disposed away from the seat frame without being fastened to the seat frame. In the above configuration, since mounting stability of the mounting portion is improved, the hold portion can be disposed away from the seat frame without being attached to the seat frame. Thus, the shape and the size of the hold portion can be set appropriately according to the held member regardless of a configuration of the seat frame. That is, in the above configuration, it is possible to attach the holding member to the seat frame more firmly and effectively.

In the aspect of the present invention, the holding member may be fastened and attached to a surface of the seat frame other than a top surface of the seat frame. In the above configuration, the holding member can be attached to the seat frame while the top surface of the seat frame is kept in a free state. That is, in the above configuration, it is possible to attach the holding member to the seat frame more firmly and more effectively.

In the aspect of the present invention, the five or more reinforcing portions may be disposed radially at regular intervals around the mounting portion. In the above configuration, since the five or more reinforcing portions are disposed at regular intervals, it is possible to further firmly attach the holding member to the seat frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the present invention will be described with reference to FIGS. 1 to 11. In each of the drawings, a reference sign F indicates a vehicle-seat front side, a reference sign B indicates a vehicle-seat rear side, a reference sign UP indicates a vehicle-seat upper side, and a reference sign DW indicates a vehicle-seat lower side, a reference sign R indicates a vehicle-seat right side, and a reference sign L indicates a vehicle-seat left side, appropriately. A vehicle seat 2 in FIG. 1 includes a seat cushion 4, a seat back 6, and a headrest 8. The seat components each include: a seat frame (4F, 6F, 8F) serving as a seat framework; a seat pad (4P, 6P, 8P) defining a seat outer shape; and a seat cover (4S, 6S, 8S) covering the seat pad. In the present embodiment, a lower part of the seat back 6 is connected to a rear part of the seat cushion 4 such that the seat back 6 is tiltable (i.e., the seat back 6 is able to be disposed in a standing state and in a laid-down state) and the headrest 8 is positioned on an upper part of the seat back 6 in the standing state.

Figure 1:
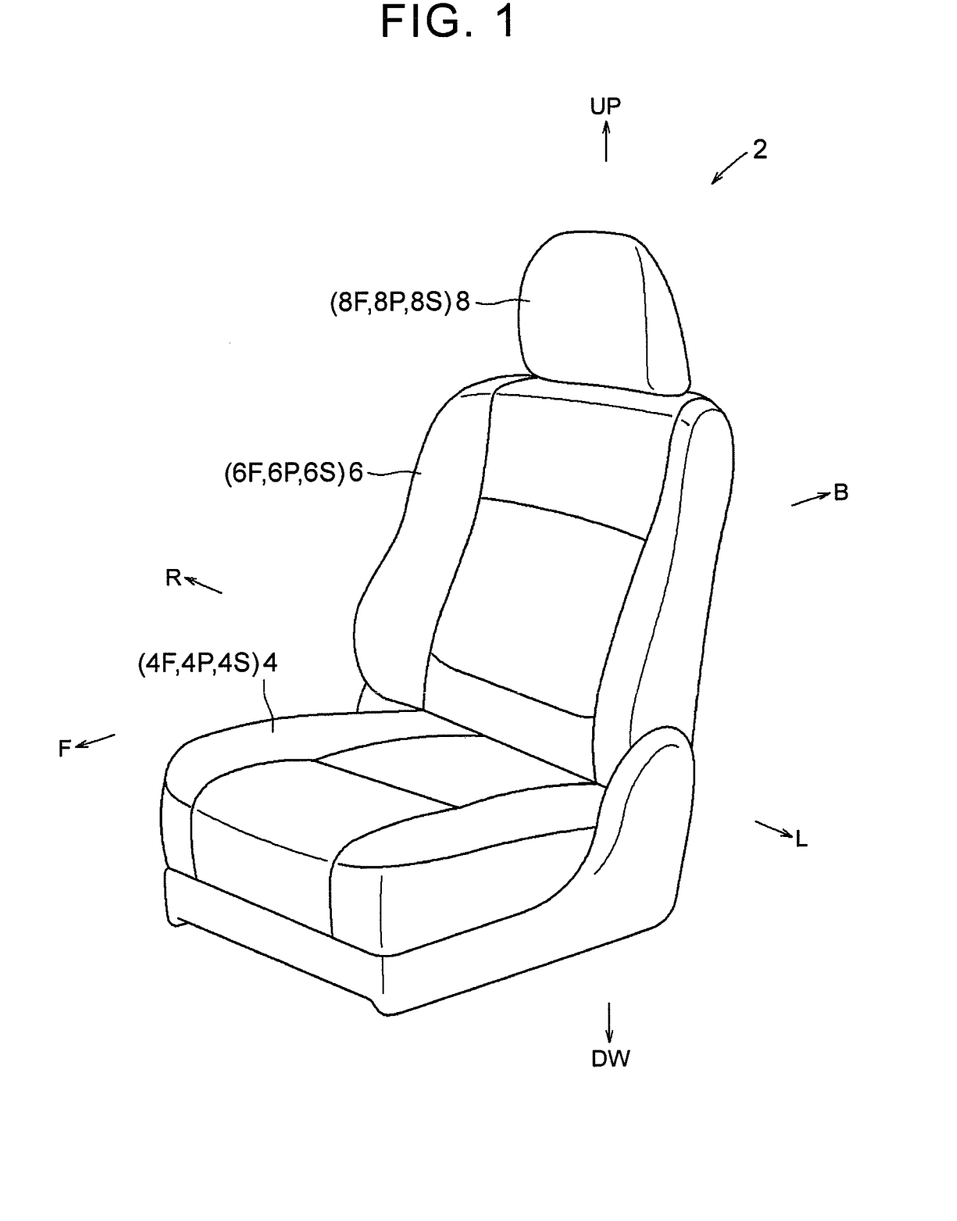
FIG. 1 is a perspective view of a vehicle seat.
Figure 3:
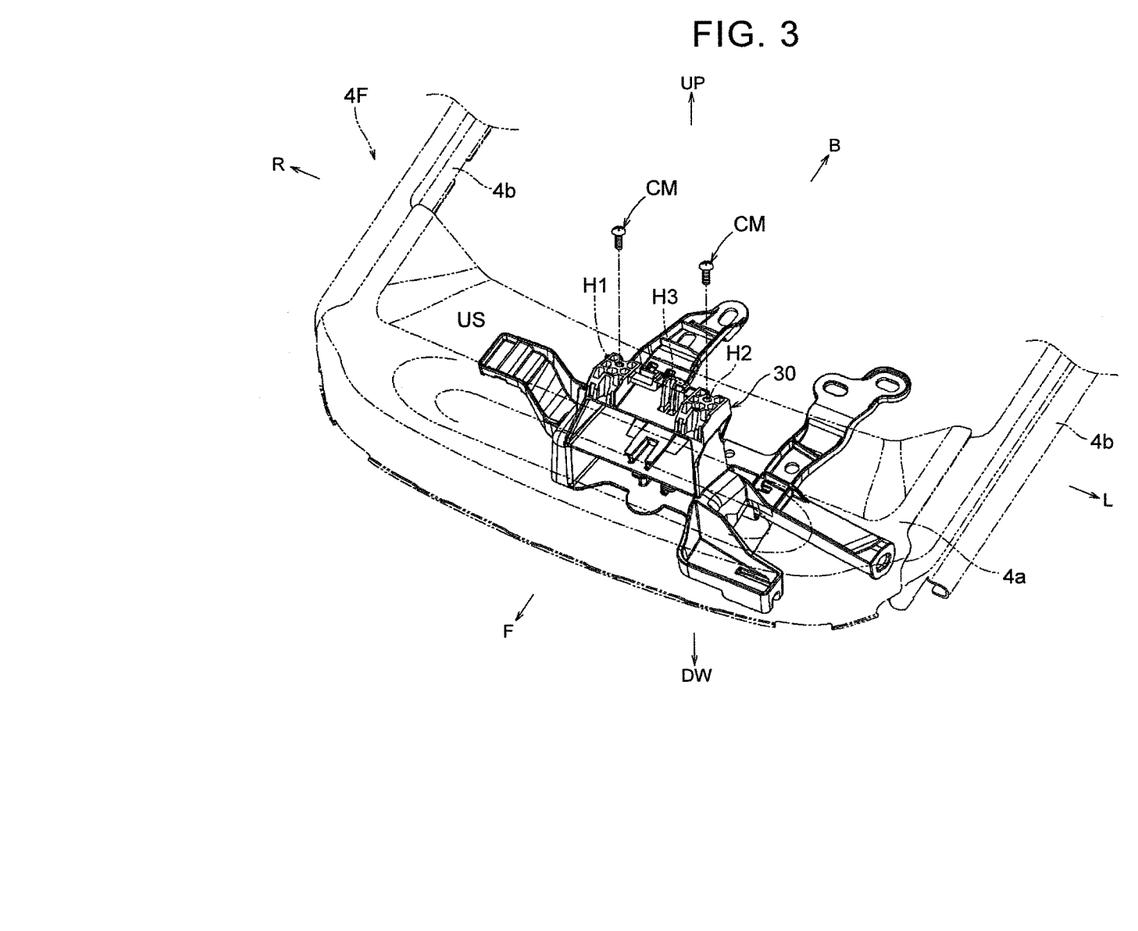
FIG. 3 is a perspective view of a part of the seat frame and a holding member.
Figure 11:
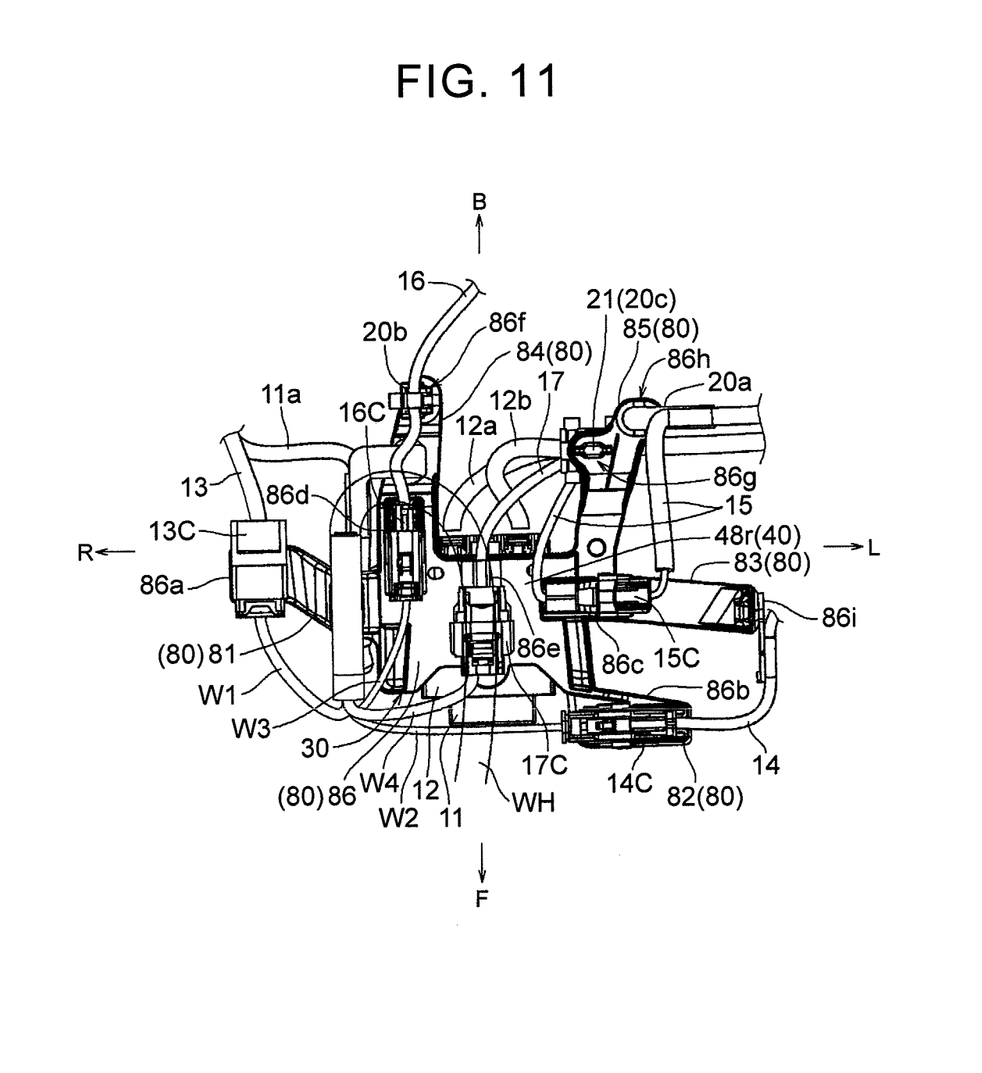
FIG. 11 is a view of the holding member that holds the held members, when viewed from a seat lower side.

With reference to FIGS. 1, 3, and 11, the seat cushion 4 includes the abovementioned basic constituents (4F, 4P, 4S), a holding member 30, and a plurality of held members 11 to 17 (details of each member will be described later). In the present embodiment, the held members 11 to 17 disposed inside the seat cushion 4 are held by the holding member 30 attached to the seat frame 4F. In this configuration, in consideration that a weight of the holding member 30 that holds the plurality of held members 11 to 17 increases, it is desirable that the holding member 30 be more firmly attached to the seat frame 4F. In view of this, in the present embodiment, with the after-mentioned configuration, the holding member 30 is more firmly attached to the seat frame 4F. The following describes each constituent more specifically.

Here, the seat cushion 4 is formed by disposing the seat pad 4P on the seat frame 4F, and then covering the seat pad 4P with the seat cover 4S. The seat cover 4S is a bag-shaped (pouch-shaped) member that can cover the seat pad 4P, and can be formed of fabric (woven fabric, knitted fabric, nonwoven fabric) or leather (natural leather, synthetic leather). Further, the seat pad 4P is a member elastically supporting an occupant (a substantially rectangular member that is placeable on the after-mentioned seat frame 4F), and can be formed of a resin member such as polyurethane foam (density: 10 kg/m$^3$ to 60 kg/m$^3$), for example.

Figure 2:
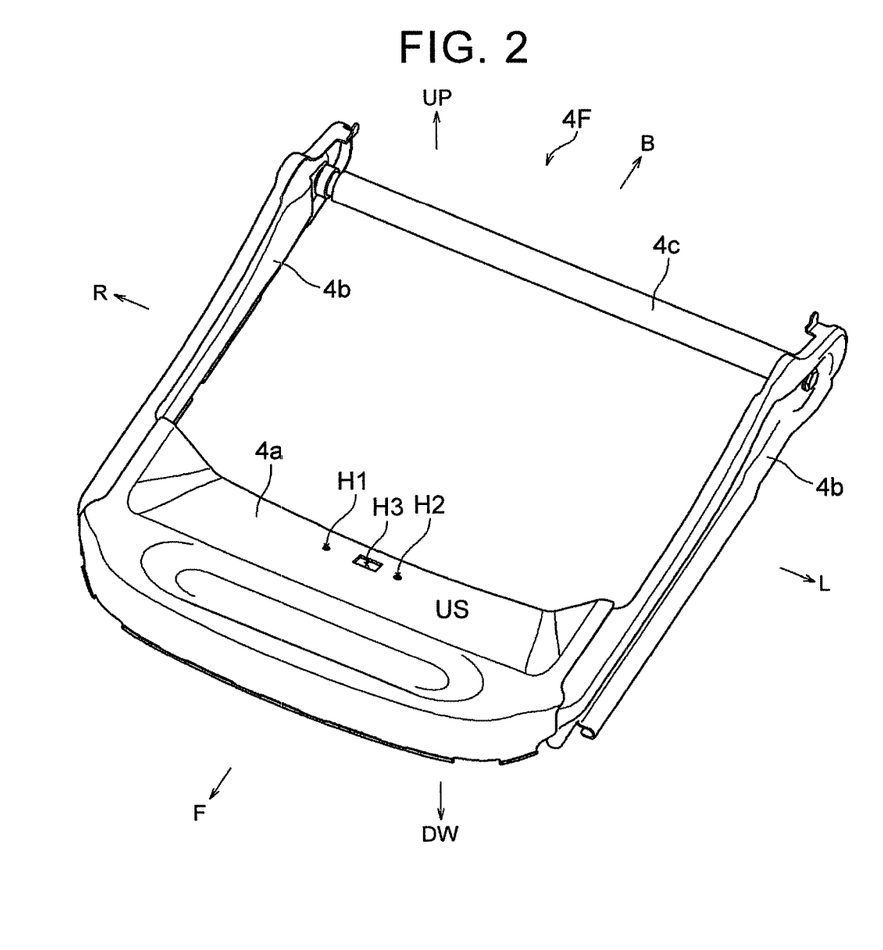
FIG. 2 is a perspective view of a seat frame.

With reference to FIG. 2, the seat frame 4F is a frame body having a substantially rectangular shape in a top view, and includes a front frame 4a, a pair of side frames 4b, and a rear frame 4c. The side frames 4b are flat plate-shaped members that constitute respective side frameworks of the seat cushion 4, and are disposed on seat lateral sides so as to face each other. Further, the rear frame 4c is a rod material (in a pipe shape) that reinforces a rear part of the seat frame 4F, and is disposed on rear sides of the pair of side frames 4b to bridge (connect) the side frames 4b.

Figure 7:
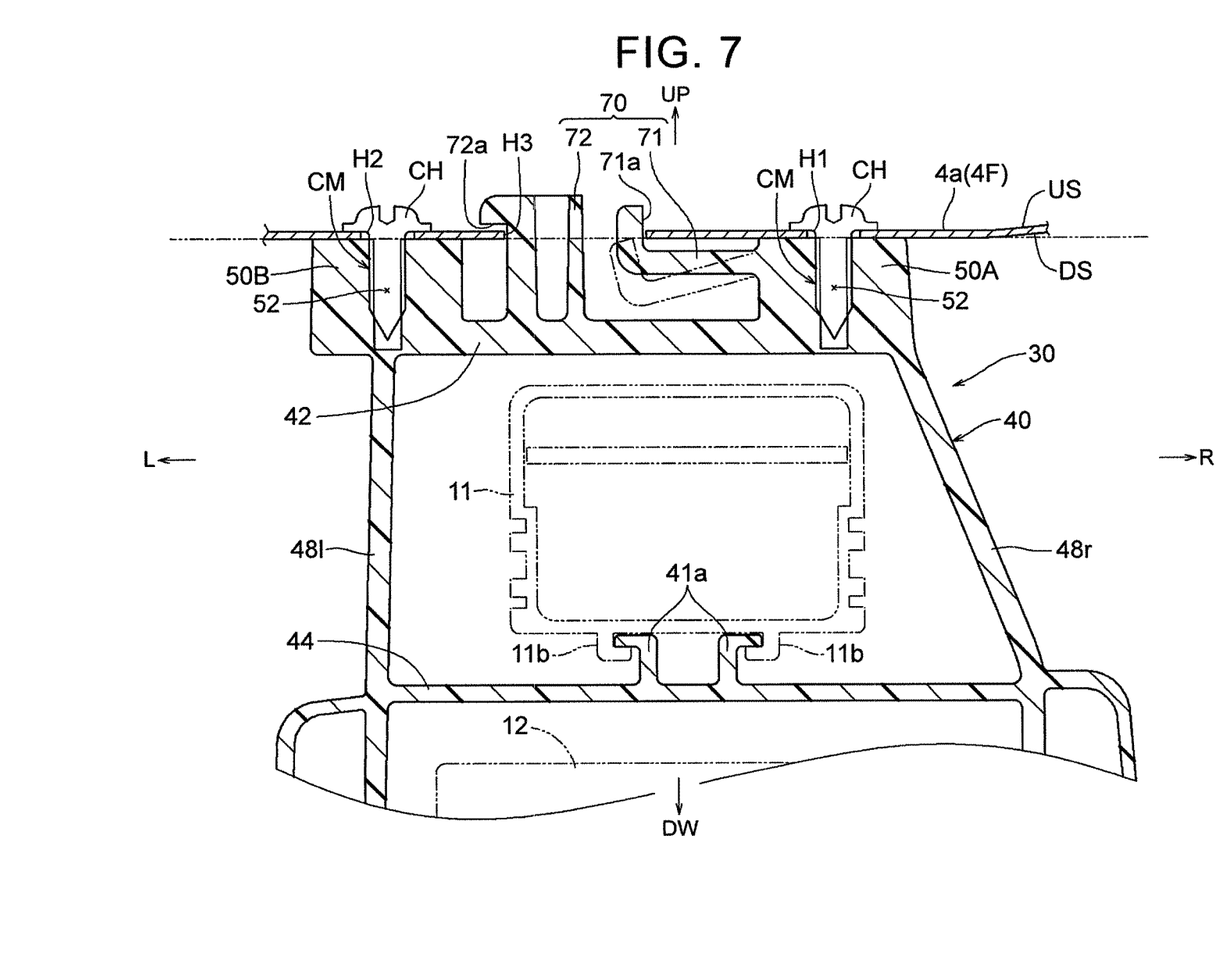
FIG. 7 is a sectional view of parts of the holding member and the seat frame corresponding to a section taken along a line VII-VII in FIG. 6.

Further, with reference to FIGS. 2, 3, the front frame 4a is a flat plate-shaped member constituting a front-side framework of the seat cushion 4, and has a pair of fastening hole portions H1, H2 and a temporary fixing hole portion H3. Each of the pair of fastening hole portions H1, H2 is a hole portion having a substantially round shape in a top view, and extends through the front frame 4a in a thickness direction so as to be opened at a top surface US and a bottom surface DS of the front frame 4a, as shown in FIG. 7. Note that the top surface US is a surface positioned at a seat sitting side of the front frame 4a, and the bottom surface DS is a surface positioned at a seat back side of the front frame 4a. Further, the temporary fixing hole portion H3 is a substantially rectangular hole portion that is elongated in a seat-width direction in a top view, and extends through the front frame 4a in the thickness direction so as to be opened at the top surface US and the bottom surface DS. In the present embodiment, the fastening hole portions H1, H2 are formed in a rear part of the front frame 4a at an appropriate interval in the seat-width direction, and the temporary fixing hole portion H3 is formed between the fastening hole portions H1, H2.

Figure 9:
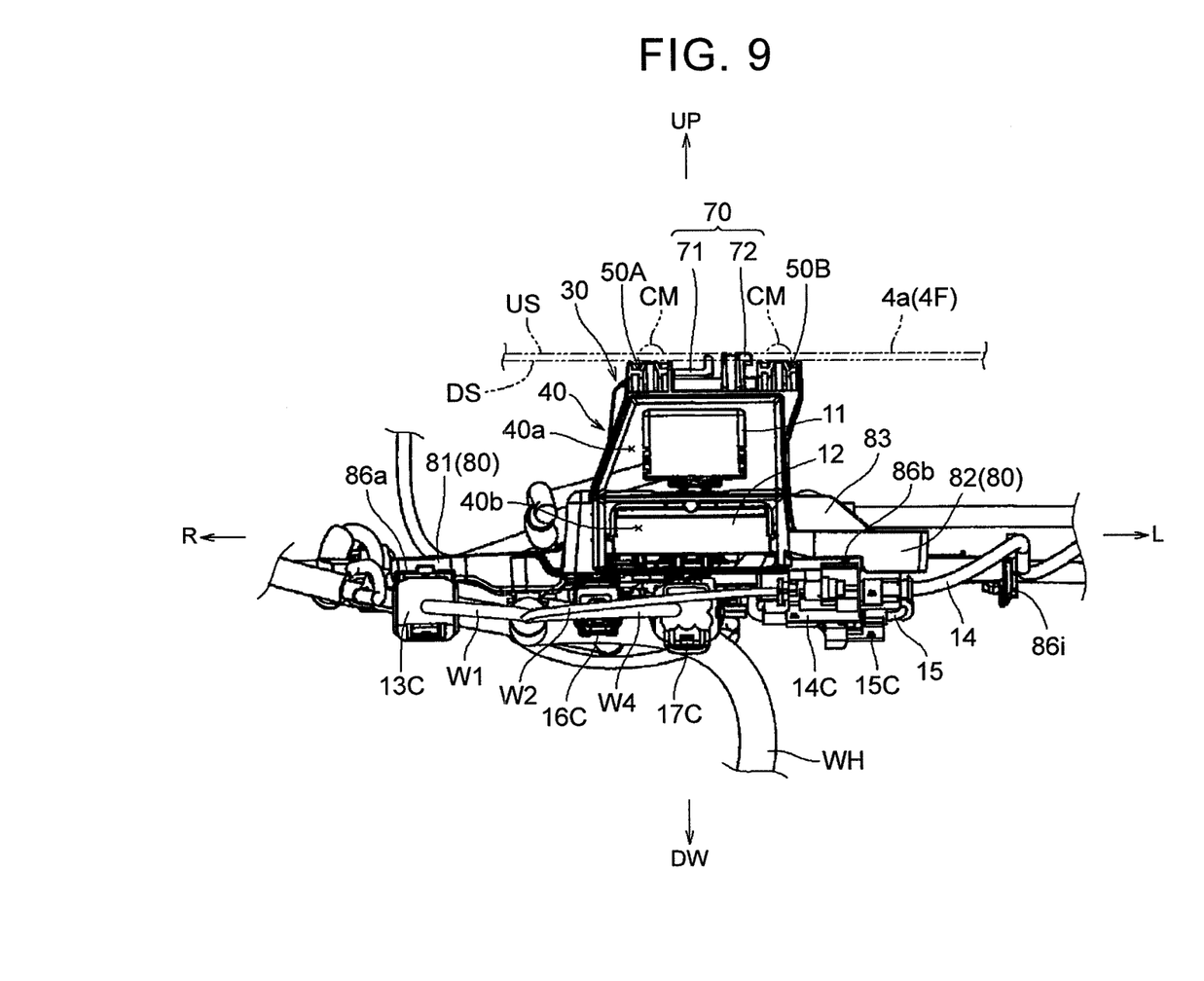
FIG. 9 is a view of the holding member that holds held members, when viewed from the seat front side.
Figure 10:
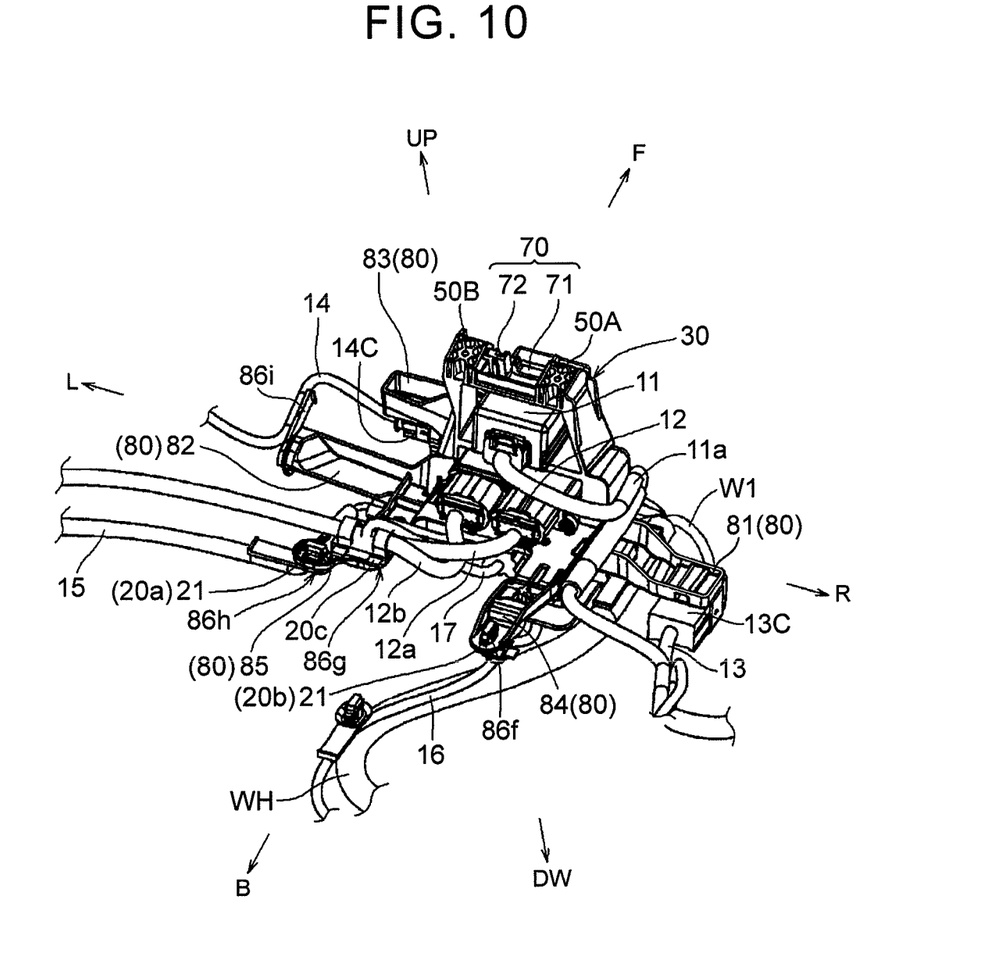
FIG. 10 is a view of the holding member that holds the held members, when viewed from the seat rear and upper side.

Here, in the present embodiment, with reference to FIGS. 9 to 11, at least part of the plurality of held members (the first held member 11 to the seventh held member 17) can be disposed inside the seat cushion 4. The first held member 11 is a substantially cubic housing (box) functioning as an ECU for a seat heater, and a first cable 11a extends from a rear surface of the first held member 11. Further, the second held member 12 is a substantially cubic housing (box) functioning as a sensor for weight detection. A pair of sensor main bodies (their reference signs are omitted) is disposed inside the second held member 12, and second cables 12a, 12b extend from the respective sensor main bodies. Respective locking parts having substantially the same configuration are provided on back sides of the first held member 11 and the second held member 12, and can be locked inside a body portion 40 of the after-mentioned holding member 30. For example, with reference to FIG. 7, a locking part 11b of the first held member 11 is constituted by a pair of guide pieces projecting from a back surface of the first held member 11, and respective end portions of the guide pieces bend inwardly.

Further, with reference to FIG. 11, each of the third held member 13 to the seventh held member 17 is a cable extending from an electric member in the vehicle seat 2, and includes a connector and a fixture for attaching each of the third held member 13 to the seventh held member 17 to the holding member 30 appropriately. The third held member 13 is a cable for a power supply system, and a third connector 13C is provided in an end portion of the third held member 13. Further, the fourth held member 14 is a cable for an airbag disposed inside the seat cushion 4, and a fourth connector 14C is provided in an end portion of the fourth held member 14. Further, the fifth held member 15 is also a cable for the airbag, and includes a fifth connector 15C provided at an intermediate portion of the fifth held member 15. The fifth held member 15 includes a part extending from one end thereof to the fifth connector 15C (i.e., a part provided on one side of the fifth connector 15C) and a part extending from the other end thereof to the fifth connector 15C (i.e., a part provided on the other side of the fifth connector 15C). Further, the sixth held member 16 is a cable for a side airbag disposed in the seat back 6, and a sixth connector 16C is provided in an end portion of the sixth held member 16. The seventh held member 17 is a cable for a seat belt, and a seventh connector 17C is provided in an end portion of the seventh held member 17. Note that, in the present embodiment, the third connector 13C, the fourth connector 14C, the sixth connector 16C, and the seventh connector 17C are electrically connected to a power supply of a vehicle via a wiring harness WH extending from a body side. Here, the wiring harness WH is a cord member extending from the power supply. The wiring harness WH is branched into a plurality of cables W1 to W4 at an intermediate position thereof, and the cables W1 to W4 are electrically connected to the corresponding connectors.

Further, with reference to FIGS. 9 to 11, fixtures 20a to 20c and the like can be attached to the third held member 13 to the seventh held member 17 at appropriate intermediate positions (in each figure, reference signs are assigned to only some of the fixtures for convenience). For example, in the present embodiment, the first fixture 20a is attached to an intermediate portion of the part of the fifth held member 15 extending from one end of the fifth connector 15C, and the second fixture 20b is attached to an intermediate portion of the sixth held member 16. Further, the part of the fifth held member 15 extending from the other end of the fifth connector 15C is put together with the second cables 12a, 12b and the seventh held member 17 by the third fixture 20c. Each of the fixtures 20a to 20c is an annular member into which corresponding one or more of the held members 15 to 17 and the second cables 12a, 12b can be inserted, and includes a clip portion 21 that can be inserted into a hold portion 80 of the after-mentioned holding member 30.

Figure 4:
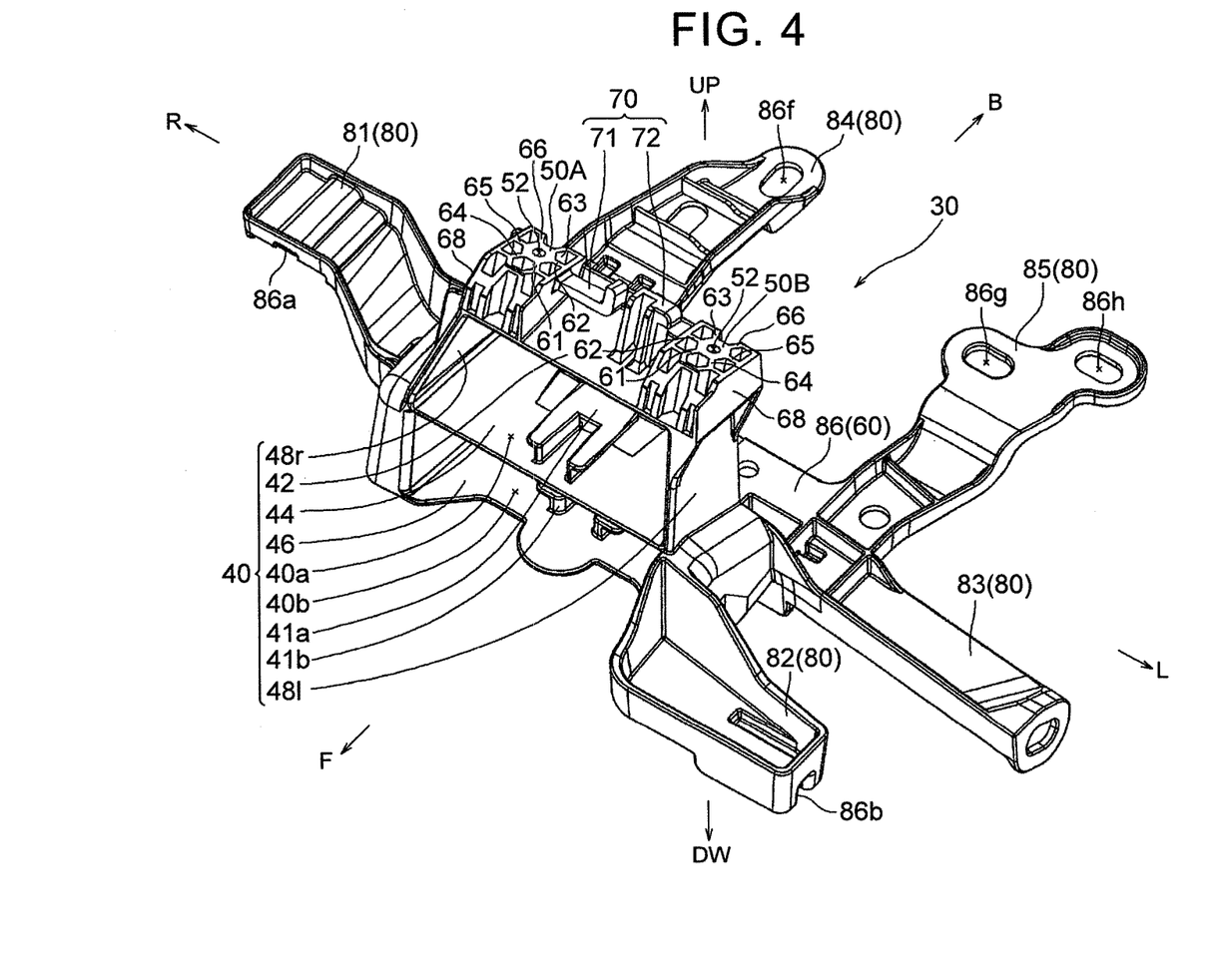
FIG. 4 is a perspective view of the holding member when viewed from a seat front upper side.
Figure 5:
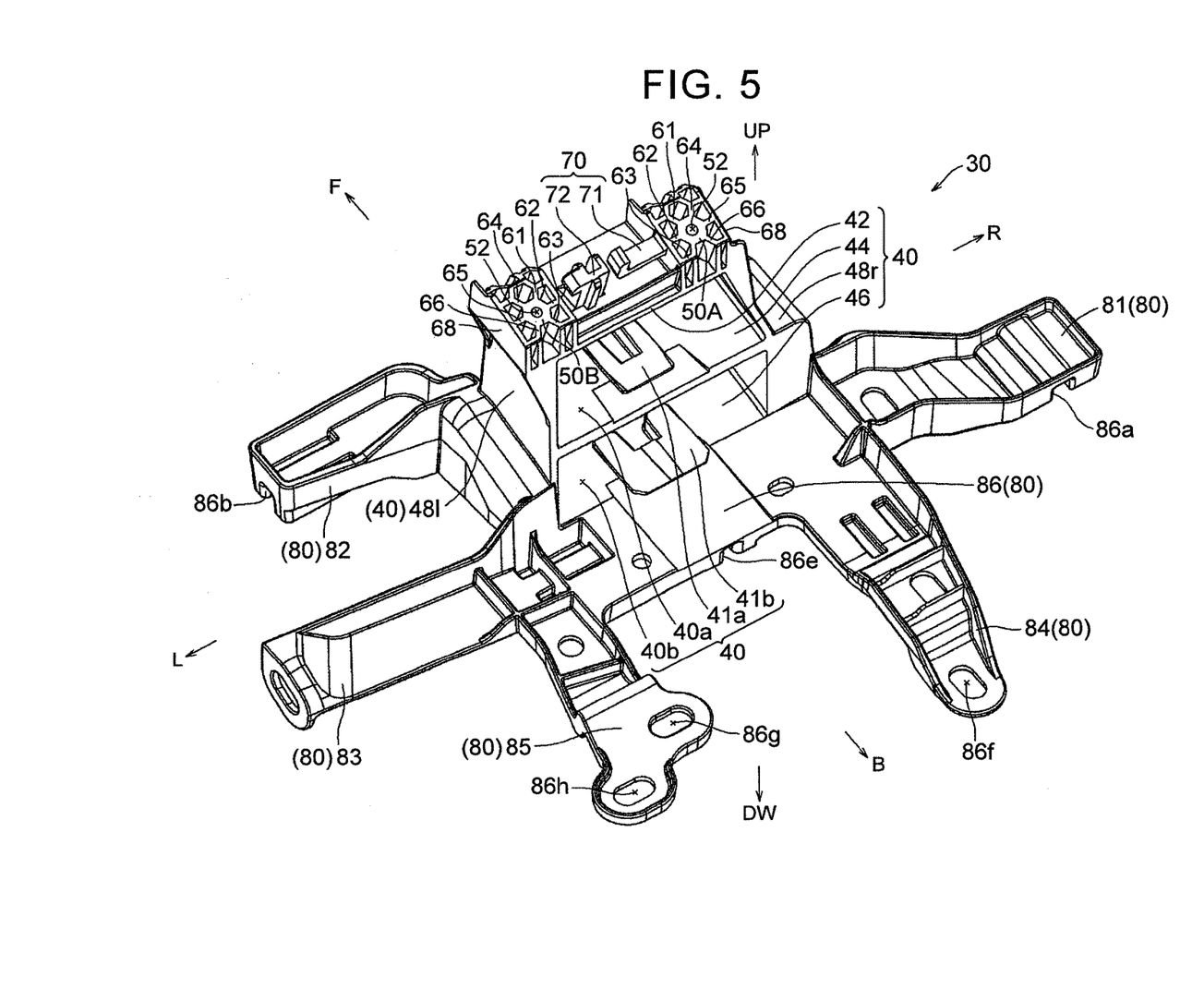
FIG. 5 is a perspective view of the holding member when viewed from a seat rear upper side.
Figure 6:
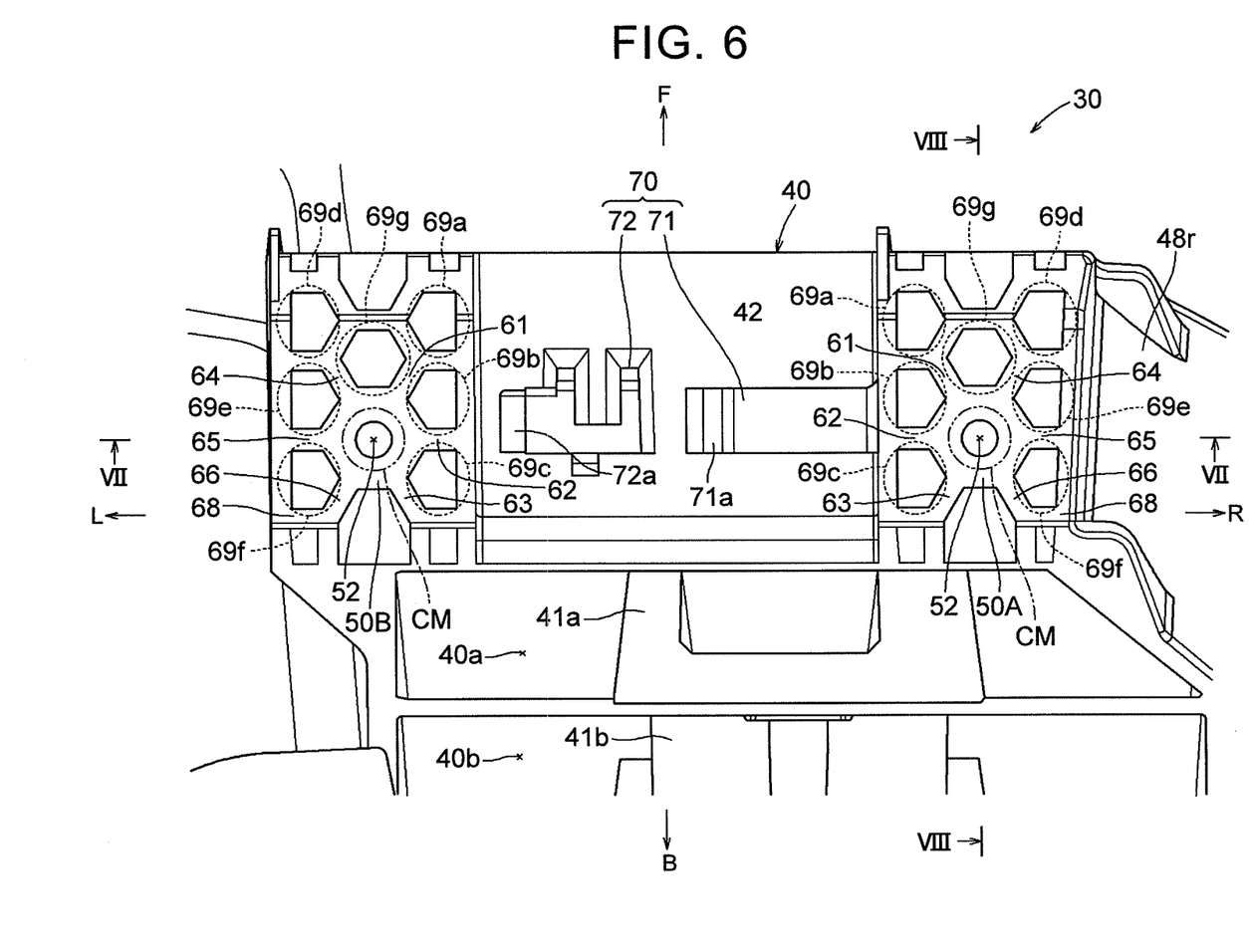
FIG. 6 is a top view of a part of the holding member.

With reference to FIGS. 4 to 11, the holding member 30 is a member that can hold the plurality of held members 11 to 17, and can be attached to the front frame 4a. The holding member 30 is one molded product made of resin. With reference to FIGS. 4 to 6, the holding member 30 includes the body portion 40, a pair of mounting portions 50A, 50B, a plurality of reinforcing portions 61 to 66 (an outer frame portion 68, a plurality of reinforcing structures 69a to 69g), a temporary fixing portion 70, and the hold portion 80. Here, a material (a kind of the resin) of the holding member 30 is not limited in particular. However, it is preferable that the material should have a rigidity that allows the holding member 30 to hold the plurality of held members 11 to 17. Examples of the material of the holding member 30 include hard resins such as polyethylene, polypropylene, and vinyl chloride.

With reference to FIGS. 4 and 5, the body portion 40 is a part having a quadrangular truncated pyramid shape, and includes an upper wall 42, an intermediate wall 44, a lower wall 46, a pair of side walls 48r, 48l, and the after-mentioned first receptacle portion 40a and second receptacle portion 40b. The upper wall 42 is a flat plate part having a substantially rectangular shape and forming an upper side as one side of the body portion 40, and the after-mentioned mounting portions 50A, 5B are provided on the upper wall 42. Further, the lower wall 46 is a flat plate part having a substantially rectangular shape that is longer than the upper wall 42, and forms a lower side as the other side of the body portion 40. The after-mentioned hold portion 80 is provided on the lower wall 46. Further, each of the pair of side walls 48r, 48l is a flat plate part that connects respective short sides of the upper wall 42 and the lower wall 46 to each other. In the holding member 30 in a mounted state, the side walls 48r, 48l are disposed so as to face each other when viewed in the seat-width direction. The side walls 48r, 48l are disposed so as to face each other, and are inclined or bent in such directions that the side walls 48r, 48l are gradually away from each other in a direction toward the lower wall 46 from the upper wall 42. Further, the intermediate wall 44 is a flat plate part disposed between the upper wall 42 and the lower wall 46, and is provided between the side walls 48r, 48l to bridge (connect) the side walls 48r, 48l. In the present embodiment, in the holding member 30 in the mounted state, a front side and a rear side of the body portion 40 are in an opened state, that is, the sides of the body portion 40, in which the side walls 48r, 48l are not provided, are in the opened state. Thus, the body portion 40 is opened in a seat front-rear direction.

Further, with reference to FIGS. 4 and 5, the first receptacle portion 40a is constituted by the upper wall 42, the intermediate wall 44, and the side walls 48r, 48l, so that the first held member 11 can be accommodated in a space surrounded by the walls (in each figure, a reference sign of the first receptacle portion 40a is assigned to the space for convenience). A first locking portion 41a that can lock the locking part 11b of the first held member 11 is provided on a top surface of the intermediate wall 44. The first locking portion 41a is a projecting part having a substantially U-shape in a top view. With reference to FIG. 7, an upper end of a peripheral edge of the first locking portion 41a is bent outward so as to lock the locking part 11b. Further, the second receptacle portion 40b is constituted by the lower wall 46, the intermediate wall 44, and the side walls 48r, 48l, so that the second held member 12 can be accommodated in a space surrounded by the walls (in each figure, a reference sign of the second receptacle portion 40b is assigned to the space for convenience). A second locking portion 41b that can lock a locking part (not shown) of the second held member 12 is also provided on a top surface of the lower wall 46. The second locking portion 41b is a projecting part slightly larger than the first locking portion 41a, and has substantially the same configuration as that of the first locking portion 41a.

With reference to FIGS. 4 to 8, a pair of mounting portions (the first mounting portion 50A, the second mounting portion 50B) is a pair of tubular parts attached to the front frame 4a via the after-mentioned fastening members CM. Each of the mounting portions 50A, 50B is a tubular part having a hexagonal pillar shape and projects toward the front frame 4a from the upper wall 42 serving as one side of the body portion 40, in the holding member 30 in the mounted state. A fastened hole portion 52 into which the after-mentioned fastening member CM can be inserted is provided in a center of each of the mounting portions 50A, 50B, and a spiral groove into which the fastening member CM can be screwed is provided on an inner peripheral surface defining the fastened hole portion 52. In the present embodiment, in the holding member 30 in the mounted state, the first mounting portion 50A is disposed in a right end of the upper wall 42, and the second mounting portion 50B is disposed in a left end of the upper wall 42. The fastened hole portions 52 of the mounting portions 50A, 50B are disposed so as to face the corresponding fastening hole portions H1, H2, respectively (see FIG. 3). Note that a depth of the fastened hole portion 52 is not limited in particular as long as the fastening member CM can be inserted therein. However, with reference to FIG. 7, it is desirable that the depth of the fastened hole portion 52 should be larger than a length of the fastening member CM in a state where the fastening member CM projects from the bottom surface DS of the front frame 4a.

With reference to FIG. 6, the plurality of reinforcing portions 61 to 66 are flat plate-shaped parts that reinforce the first mounting portion 50A or the second mounting portion 50B, and each of the mounting portions is provided with five or more reinforcing portions. In the present embodiment, each of the mounting portions 50A, 50B is provided with six reinforcing portions (the first reinforcing portion 61 to the sixth reinforcing portion 66), and the outer frame portion 68 and the plurality of reinforcing structures 69a to 69g as constituents related to the reinforcing portions 61 to 66 (the reinforcing portions 61 to 66 and the constituents related to the reinforcing portions 61 to 66 will be described later more specifically). Since the configurations of the plurality of reinforcing portions 61 to 66 for the mounting portion 50A are substantially the same as those for the mounting portion 50B, the configurations of the plurality of reinforcing portions 61 to 66 and the related constituents for the first mounting portion 50A will be described as an example. Note that, the reinforcing portions and the related constituents for the second mounting portion 50B are indicated by the same reference signs as the reference signs of the corresponding constituents for the first mounting portion 50A, and detailed descriptions thereof will be omitted.

With reference to FIG. 6, the first reinforcing portion 61 to the sixth reinforcing portion 66 are flat plate-shaped parts projecting from the upper wall 42 of the body portion 40 toward the front frame 4a and connected to (continuous with) the first mounting portion 50A. The reinforcing portions 61 to 66 are disposed at regular intervals so as to extend radially outwardly from corner portions of the first mounting portion 50A around a shaft center of the first mounting portion 50A. In the present embodiment, the first reinforcing portion 61 to the third reinforcing portion 63 are disposed on a seat inward side (a side indicated by an arrow L in FIG. 6) relative to the first mounting portion 50A, and are disposed in the stated order from the seat front side toward the rear side, in the holding member 30 in the mounted state. Further, the fourth reinforcing portion 64 to the sixth reinforcing portion 66 are disposed on a seat outward side (a side indicated by an arrow R in FIG. 6) relative to the first mounting portion 50A, and are disposed in the stated order from the seat front side toward the rear side. In the present embodiment, some of the reinforcing portions, that is, the reinforcing portions 61, 63, 64, 66 extend so as to be bent or branched into two appropriately at intermediate positions, so that the after-mentioned plurality of reinforcing structures 69a to 69g is formed.

With reference to FIG. 6, the outer frame portion 68 is a flat plate-shaped frame body having a substantially square shape in a top view, and is disposed so as to surround the six reinforcing portions 61 to 66. Further, the reinforcing structures (the first reinforcing structure 69a to the seventh reinforcing structure 69g) are structures formed around the first mounting portion 50A, and are constituted by some of the reinforcing portions and the outer frame portion 68. In the present embodiment, the first reinforcing structure 69a to the third reinforcing structure 69c are disposed on the seat inward side relative to the first mounting portion 50A, and are disposed in the stated order from the seat front side toward the rear side. Further, the fourth reinforcing structure 69d to the sixth reinforcing structure 69f are disposed on the seat outward side relative to the first mounting portion 50A, and are disposed in the stated order from the seat front side toward the rear side. Further, the seventh reinforcing structure 69g is disposed on the sheet front side relative to the first mounting portion 50A. The first reinforcing structure 69a and the second reinforcing structure 69b are disposed on one side of the seventh reinforcing structure 69g, and the fourth reinforcing structure 69d and the fifth reinforcing structure 69e are disposed on the other side of the seventh reinforcing structure 69g.

With reference to FIG. 6, the first reinforcing structure 69a of the present embodiment is a pentagonal columnar structure. The branched first reinforcing portion 61 extends forward so as to be bent appropriately and connected to the outer frame portion 68, and thus, the first reinforcing structure 69a is formed. Further, the second reinforcing structure 69b is a pentagonal columnar structure. The first reinforcing portion 61 is bent at an intermediate position and connected to the outer frame portion 68 together with the second reinforcing portion 62, and thus, the second reinforcing structure 69b is formed. Further, the third reinforcing structure 69c is a pentagonal columnar structure. The third reinforcing portion 63 is bent at an intermediate position and connected to the outer frame portion 68 together with the second reinforcing portion 62, and thus, the third reinforcing structure 69c is formed. Furthermore, the fourth reinforcing structure 69d is a pentagonal columnar structure. The branched fourth reinforcing portion 64 extends forward so as to be bent appropriately and connected to the outer frame portion 68, and thus, the fourth reinforcing structure 69d is formed. Further, the fifth reinforcing structure 69e is a pentagonal columnar structure. The fourth reinforcing portion 64 is bent at an intermediate position and connected to the outer frame portion 68 together with the fifth reinforcing portion 65, and thus, the fifth reinforcing structure 69e is formed. Further, the sixth reinforcing structure 69f is a pentagonal columnar structure. The sixth reinforcing portion 66 is bent at an intermediate position and connected to the outer frame portion 68 together with the fifth reinforcing portion 65, and thus, the sixth reinforcing structure 69f is formed. The seventh reinforcing structure 69g is a hexagonal columnar structure (having a honeycomb shape) disposed in front of the first mounting portion 50A. The first reinforcing portion 61 and the fourth reinforcing portion 64 are bent appropriately so as to be connected to each other at a position on the seat front side, and thus, the seventh reinforcing structure 69g is formed.

With reference to FIGS. 4 to 7, the temporary fixing portion 70 is a part that temporarily fixes the holding member 30 to the seat frame 4F before the holding member 30 is fastened to the seat frame 4F. The temporary fixing portion 70 includes a first engaging part 71 and a second engaging part 72, and is provided on the upper wall 42 and disposed so as to face the temporary fixing hole portion H3. The first engaging part 71 is a substantially lateral L-shaped bar part extending from the outer frame portion 68 disposed on a right side. The first engaging part 71 extends toward the left side from an inner surface of the outer frame portion 68, and then a distal end side thereof is bent upward so that a barb 71a is formed. With reference to FIG. 7, the first engaging part 71 is deformable in a flexible manner in an up-down direction due to its own flexibility at the time when the holding member 30 is temporarily fixed. Further, the second engaging part 72 is a substantially rectangular columnar body. The second engaging part 72 projects from the upper wall 42, and is disposed close to the outer frame portion 68 on the left side. A barb 72a projecting toward the outer frame portion 68 on the left side is provided in an upper part of the second engaging part 72. With reference to FIG. 7, in the present embodiment, at the time when the holding member 30 is mounted, the first engaging part 71 and the second engaging part 72 are engaged with the peripheral edge around the temporary fixing hole portion H3 of the front frame 4a. At this time, the barbs 71a, 72a of respective engaging parts are disposed above the mounting portions 50A, 50B. Therefore, in a temporal fixing state, the holding member 30 hangs down from the front frame 4a via the temporary fixing portion 70, and a small gap is formed between the fastening hole portions H1, H2 opened at the bottom surface DS and the fastened hole portions 52.

With reference to FIGS. 4 and 5, the hold portion 80 is a part that can hold at least one of the plurality of held members, and is provided on a lower side serving as the other side of the body portion 40 in the holding member 30 in the mounted state. The hold portion 80 is disposed away from the front frame 4a without being fastened to the front frame 4a, and has a shape and a size according to a configuration (a shape, a size, a number, a disposition position, and the like) of a held member to be held by the hold portion 80. The hold portion 80 of the present embodiment is constituted by a plurality of hold arms (a first hold arm 81 to a fifth hold arm 85), and a flat plate-shaped extending portion 86 extending toward the seat rear side from the lower wall 46, and includes the after-mentioned plurality of holding structures 86a to 86i. The first hold arm 81 is a flat plate part having a substantially rectangular shape, and is disposed on a right rear part of the lower wall 46 so as to extend toward the seat right side. A peripheral edge of the first hold arm 81 is bent to form a flange portion, so that the strength of the first hold arm 81 is increased. Further, the second hold arm 82 is a flat plate part having a substantially rectangular shape that is disposed on a left front part of the lower wall 46 so as to extend toward the seat left side. A peripheral edge of the second hold arm 82 is bent to form a flange portion. Further, the third hold arm 83 is a substantially cylindrical part, and is disposed on a left rear part of the lower wall 46 so as to extend toward the seat left side. Further, the fourth hold arm 84 is a flat plate part having a substantially rectangular shape, and is disposed on a right side of the extending portion 86 so as to extend toward the seat rear side. A peripheral edge of the fourth hold arm 84 is bent to form a flange portion. The fifth hold arm 85 is a flat plate part having a substantially rectangular shape, and is disposed on a left side of the extending portion 86 so as to extend toward the seat rear side. A peripheral edge of the fifth hold arm 85 is bent to form a flange portion.

With reference to FIG. 11, each of the plurality of holding structures (the first holding structure 86a to the ninth holding structure 86i) is a structure that can hold one or more of the third held member 13 to the seventh held member 17. The first holding structure 86a is provided on a bottom surface of the first hold arm 81, and can hold the third held member 13 by locking the third connector 13C. Further, the second holding structure 86b is provided on a bottom surface of the second hold arm 82, and can hold the fourth held member 14 by locking the fourth connector 14C. Further, the third holding structure 86c is provided on a bottom surface of the third hold arm 83, and can hold the fifth held member 15 by locking the fifth connector 15C. Further, the fourth holding structure 86d is provided on a bottom surface of the fourth hold arm 84, and can hold the sixth held member 16 by locking the sixth connector 16C. The fifth holding structure 86e is provided in a substantially center of a bottom surface of the extending portion 86, and can hold the seventh held member 17 by locking the seventh held member 17. The configurations of the first holding structure 86a to the fifth holding structure 86e are not limited particularly as long as the corresponding held members can be locked by the first holding structure 86a to the fifth holding structure 86e. For example, in the present embodiment, each of the first holding structure 86a to the fifth holding structure 86e is constituted by a pair of guide pieces (not shown) bent in a substantially L-shape, and the corresponding held member can be inserted between the guide pieces. Each of the guide pieces is locked by (engaged with) a recessed portion or a guided piece provided in the corresponding held member, and thus, each of the holding structures can hold and lock the corresponding held member.

Further, with reference to FIGS. 10 and 11, each of the sixth holding structure 86f to the eighth holding structure 86h is a part into which a clip portion 21 of a corresponding one of the fixtures 20a to 20c is inserted so as to be locked. The sixth holding structure 86f is a through-hole extending through the fourth hold arm 84 in a thickness direction, and can be provided at a distal end side of the hold arm. Further, the seventh holding structure 86g and the eighth holding structure 86h are through-holes extending through the fifth hold arm 85 in a thickness direction, and can be provided at a distal end side of the hold arm. The ninth holding structure 86i is a flat plate-shaped member attached to a distal end of the second hold arm 82, and can hold the corresponding held member with the use of a belt, adhesion, or the like (not shown).

Figure 8:
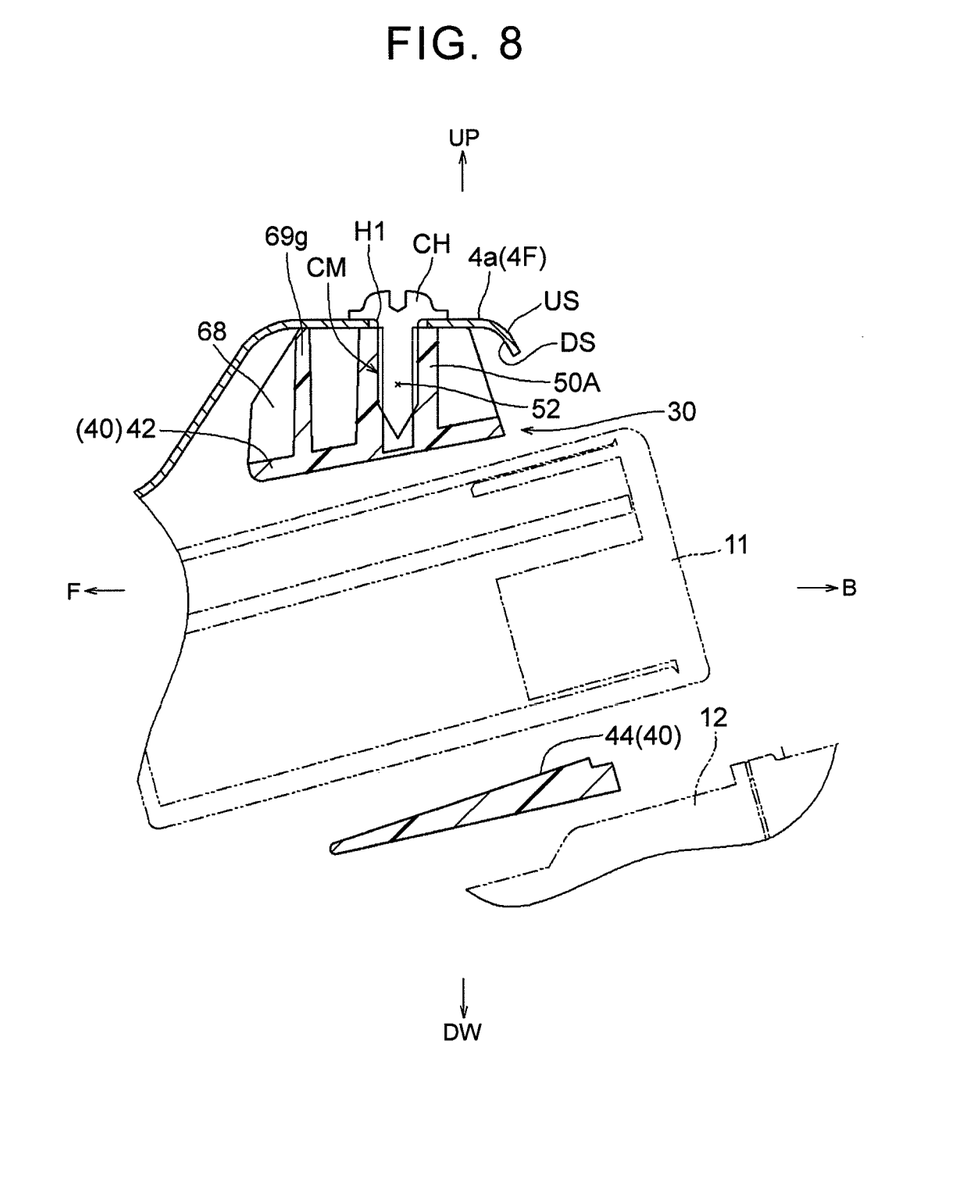
FIG. 8 is a sectional view of the parts of the holding member and the seat frame corresponding to a section taken along a line VIII-VIII in FIG. 6.

With reference to FIGS. 3, 7, and 8, the holding member 30 is attached to the bottom surface DS of the front frame 4a via the fastening members CM, and thus, the plurality of held members 11 to 17 illustrated in FIG. 11 is held by the holding member 30. Each of the fastening member CM is a metal bar (rod) member having a size that allows the fastening member CM to penetrate through the front frame 4a in a thickness direction of the front frame 4a, and has a spiral groove formed on a peripheral surface thereof, and a wide head CH formed on one end side thereof in a hemispheric shape. In the present embodiment, the holding member 30 is disposed on the bottom surface DS of the front frame 4a, and then, the temporary fixing portion 70 is inserted into the temporary fixing hole portion H3 while the fastening hole portions H1, H2 are aligned with respective fastened hole portions 52. At this time, with reference to FIG. 7, the barb 72a of the second engaging part 72 is engaged with one side portion of the edge around the temporary fixing hole portion H3 while the first engaging part 71 is flexed (bent) downward. Then, the barb 71a is engaged with the other side portion of the edge around the temporary fixing hole portion H3 while the first engaging part 71 returns to its original state. Thus, the holding member 30 is temporarily fixed to the front frame 4a. In this temporal fixing state, the holding member 30 hangs down from the bottom surface DS of the front frame 4a via the temporary fixing portion 70, and a small gap is formed between the fastening hole portions H1, H2 and the fastened hole portions 52 (note that FIG. 7 illustrates a state where the holding member has been fastened). In view of this, the other end sides of the fastening members CM are inserted into the respective fastening hole portions H1, H2 of the front frame 4a so as to project from the bottom surface DS. The other end sides of the fastening members CM are opposite to the heads CH. By screwing the fastening members CM into the respective fastened hole portions 52 in this state, it is possible to relatively firmly attach the holding member 30 to the front frame 4a.

Around the time of the above operation, the plurality of held members 11 to 17 is disposed in the holding member 30 so that the plurality of held members 11 to 17 is held by the holding member 30, with reference to FIGS. 9 to 11. At this time, the first held member 11 is inserted in and locked to the first receptacle portion 40a of the body portion 40 such that the first held member 11 is held, and the second held member 12 is inserted in and locked to the second receptacle portion 40b such that the second held member 12 is held. Further, with reference to FIG. 11, the third held member 13 to the seventh held member 17 are held by the first holding structure 86a to the ninth holding structure 86i of the hold portion 80. For example, by locking the third connector 13C of the third held member 13 to the first holding structure 86a, the third held member 13 is held by the hold portion 80 so as to extend toward the seat rear side. Further, the fourth connector 14C of the fourth held member 14 is locked to the second holding structure 86b, and the fourth held member 14 is extended toward the seat left side. The fourth held member 14 is held by the ninth holding structure 86i of the third hold arm 83 at an intermediate portion of the fourth held member 14 while the fourth held member 14 is routed (disposed).

Similarly, with reference to FIG. 11, the fifth connector 15C of the fifth held member 15 is locked to the third holding structure 86c, the sixth connector 16C of the sixth held member 16 is locked to the fourth holding structure 86d, and the seventh connector 17C of the seventh held member 17 is locked to the fifth holding structure 86e. The fifth held member 15 to the seventh held member 17 are held by the hold portion 80 so as to extend toward the seat rear side. The first fixture 20a provided at the intermediate portion of the fifth held member 15 is inserted into and locked to the eighth holding structure 86h of the fifth hold arm 85. Further, the second fixture 20b provided at the intermediate portion of the sixth held member 16 is inserted into and locked to the sixth holding structure 86f of the fourth hold arm 84. Further, the third fixture 20c that puts together the fifth connector 15C, the second cables 12a, 12b, and the seventh held member 17 is inserted into and locked to the seventh holding structure 86g of the fifth hold arm 85.

Thus, with reference to FIGS. 7 to 9, the holding member 30 holds the held members 11 to 17 in a state where the holding member 30 is attached to the front frame 4a via the fastening members CM. In this configuration, for example, when the third held member 13 to the seventh held member 17 are pulled, the holding member 30 may swing around the mounting portions 50A, 50B as a base point. Therefore, it is desirable that the holding member 30 should be more firmly attached to the front frame 4a so as to prevent the holding member 30 from falling off from the seat frame 4F due to swinging or the like.

In view of this, in the present embodiment, with reference to FIGS. 7 and 8, the mounting portions 50A, 50B of the holding member 30 are fastened to the front frame 4a via the metal fastening members CM so that the holding member 30 is attached to the front frame 4a relatively firmly. Further, with reference to FIG. 6, each of the mounting portions 50A, 50B is reinforced by the first reinforcing portion 61 to the sixth reinforcing portion 66. The six reinforced portions 61 to 66 are radially disposed at regular intervals around each of the mounting portions 50A, 50B. Accordingly, in the present embodiment, even if the mounting portions 50A, 50B swing in any direction, each of the mounting portions 50A, 50B can be appropriately supported by the six reinforced portions 61 to 66. Further, in the present embodiment, the first reinforcing structure 69a to the sixth reinforcing structure 69f are formed so as to surround each of the mounting portions 50A, 50B. Therefore, for example, even when the holding member 30 swings in the seat front-rear direction, each of the mounting portions 50A, 50B can be supported appropriately, because the seventh reinforcing structure 69g having a honeycomb shape is disposed in front of each of the mounting portions 50A, 50B. Further, even when the holding member 30 swings in the seat-width direction, the first reinforcing structure 69a to the sixth reinforcing structure 69f are disposed on respective sides of each of the mounting portions 50A, 50B, and thus, each of the mounting portions 50A, 50B can be supported appropriately. Thus, according to the present embodiment, since each of the mounting portions 50A, 50B is supported appropriately by the plurality of reinforcing portions 61 to 66 (and the reinforcing structures 69a to 69f), it is possible to appropriately improve mounting stability of the holding member 30 with respect to the front frame 4a (i.e., stability of the holding member 30 mounted to the front frame 4a).

As described above, in the present embodiment, it is possible to more firmly attach the holding member 30 to the front frame 4a via the fastening members CM while the mounting portions 50A, 50B are each reinforced by five or more reinforcing portions 61 to 66. Further, in the present embodiment, since the mounting stability of each of the mounting portions 50A, 50B is improved, the hold portion 80 can be disposed away from the front frame 4a without being attached to the front frame 4a. With this configuration, the shape and the size of the hold portion 80 can be set appropriately according to the held members 13 to 17 regardless of the configuration of the front frame 4a. In the present embodiment, the holding member 30 can be attached to the front frame 4a while the top surface US of the front frame 4a is kept in a free state. Accordingly, when the seat pad 4P is disposed on the top surface US of the front frame 4a, it is possible to appropriately avoid a decrease of sitting comfort due to the holding member 30. Thus, according to the present embodiment, the holding member 30 can be more firmly attached to the seat frame 4F. Particularly, in the present embodiment, since the reinforced portions 61 to 66 are radially disposed at regular intervals around each of the mounting portions 50A, 50B, the holding member 30 can be further firmly attached to the seat frame 4F.

The vehicle seat of the present embodiment is not limited to the above embodiment, and other various embodiments can be employed. For example, the present embodiment deals with an example in which the six reinforcing portions 61 to 66 are provided. However, five or more reinforcing portions may be provided. Further, in the present embodiment, the plurality of reinforcing structures 69a to 69g is provided as an example of the related constituents, but the configurations (the shapes, the sizes, the formation positions, the number, and the like) of the reinforcing structures are not particularly limited. For example, all the reinforcing structures may be formed in a hexagonal columnar shape. Further, the reinforcing structures may be provided on at least one of an area in front of the mounting portion, an area behind the mounting portion and areas on both sides of the mounting portion. Note that the mounting portion may be supported only by the reinforcing portions. Further, as long as the holding member can be firmly attached to the seat frame, the plurality of reinforcing portions may be disposed radially at irregular intervals around the mounting portion.

In the present embodiment, the configuration (the shape, the size, the disposition position, and the like) of the holding member 30 is described, but the configuration of the holding member may be appropriately modified according to a seat configuration. For example, the present embodiment deals with an example in which the holding member 30 is provided on the bottom surface DS of the front frame 4a, but the disposition position of the holding member is not limited. For example, the holding member may be provided at an appropriate position (the top surface US, the bottom surface DS, the front surface, the side surface, or the like) in the front frame, at an appropriate position (an inner side surface or the like) in the side frame, or at an appropriate position in the rear frame.

In the present embodiment, the configurations (the shapes, the sizes, the numbers, the formation positions, and the like) of the body portion 40, the mounting portions 50A, 50B, the temporary fixing portion 70, and the hold portion 80 are described, but the configurations of the members may be modified appropriately. For example, a plurality of mounting portions or a single mounting portion may be provided in the holding member. Further, the shape of each mounting portion may be a rectangular tubular shape having five or more corners in a top view, or a cylindrical shape such as an elliptical cylindrical shape or a circular cylindrical shape. Further, the fastened hole portion may be bottomed as in the present embodiment, or may extend through the upper wall. Further, the shape and the size of the body portion may be modified appropriately. One or more receptacle portions may be formed, or the receptacle portions may be omitted. Further, the shape of the hold portion may be modified appropriately according to the shape and the size of a held member to be held by the hold portion. For example, the hold portion may have a plurality of hold arms or a single hold arm, or a plurality of extending portions or a single extending portion, according to the configuration of the held member to be held by the hold portion. Further, the hold portion may include the hold arm(s), or the extending portion(s), or both of the hold arm(s) and the extending portion(s). The configuration of the holding structure may be also modified according to the hold portion and the held member. Note that the hold portion may be omitted if the held member is held by the body portion.

Further, the configuration of the fastening member CM may be also modified according to the configurations of the seat frame and the mounting portion. For example, in a case where the fastened hole portion is a through-hole, the fastening member may be formed in a bolt shape such that the fastening member can be fastened with a nut on the back side of the mounting portion. Further, in this case, the fastening member projecting from the mounting portion may be inserted into a fastening hole portion of the front frame, and then fastened with a nut on the top side. Further, the fastening member may be integrated with a mounting hole portion (the fastening member may be provided in the form of a stud bolt).

Further, the present embodiment deals with an example in which the holding member 30 is provided in the seat cushion 4, but the holding member may be provided in various seat constituent components such as the seat back. Further, various members, such as a motor, a sensor, and a bracket, to be disposed inside the seat may be regarded as (used as) the held members. The holding member may hold a plurality of held members or a single held member. The configuration of the present embodiment is applicable to general vehicle seats for a vehicle, an aircraft, a train, and the like.

What is claimed is:

1. A vehicle seat comprising:
a seat frame serving as a seat framework; and
a holding member including a mounting portion that is attached to the seat frame, wherein:
the holding member is attached to the seat frame via the mounting portion and is disposed and configured to hold a held member that is other than the seat frame and the holding member;
the mounting portion is a tubular part projecting from the holding member toward the seat frame;
a fastening member projects from one of the seat frame and the mounting portion and is inserted into the other of the seat frame and the mounting portion such that the holding member is fastened and attached to the seat frame; and
the holding member includes five or more flat plate-shaped reinforcing portions projecting from the holding member toward the seat frame, and the five or more reinforcing portions are connected to the mounting portion, and are disposed radially around the mounting portion.

2. The vehicle seat according to claim 1, wherein:
the holding member includes a body portion, the mounting portion provided on one side of the body portion, and a hold portion provided on another side of the body portion; and
in a state where the mounting portion is fastened to the seat frame, the hold portion holds the held member and is disposed away from the seat frame without being fastened to the seat frame.

3. The vehicle seat according to claim 2, wherein the mounting portion is provided on an upper side of the body portion, and the hold portion is provided on a lower side of the body portion.

4. The vehicle seat according to claim 1, wherein the holding member is fastened and attached to a surface of the seat frame other than a top surface of the seat frame.

5. The vehicle seat according to claim 1, wherein
the five or more reinforcing portions are disposed radially at regular intervals around the mounting portion.

\* \* \* \* \*